United States Patent [19]

Bloch et al.

[11] 3,977,972

[45] Aug. 31, 1976

[54] METHOD AND APPARATUS FOR RECLAIMING CONTAMINATED LIQUID

[75] Inventors: Heinz P. Bloch, Chester; Charles J. Colwell, Bernardsville, both of N.J.

[73] Assignee: Exxon Research and Engineering Company, Linden, N.J.

[22] Filed: Apr. 2, 1975

[21] Appl. No.: 564,437

[52] U.S. Cl. .............................. 210/63 R; 210/220; 208/185; 208/208 R; 208/236
[51] Int. Cl.² ......................................... B01D 19/00
[58] Field of Search ............ 210/44, 63, 48, 221 R, 210/221 P, 168, 221 M, 167, 84, 83, 220; 208/184, 185, 179, 208 R, 236; 55/73; 415/110, 112

[56] References Cited
UNITED STATES PATENTS

| | | | |
|---|---|---|---|
| 2,948,677 | 8/1960 | Alistin et al. | 210/44 |
| 3,054,602 | 9/1962 | Proudman | 210/221 R |
| 3,574,478 | 4/1971 | Toth, Jr. et al. | 415/112 |
| 3,824,766 | 7/1974 | Valentine et al. | 55/73 |

Primary Examiner—Charles N. Hart
Assistant Examiner—Benoit Castel
Attorney, Agent, or Firm—D. F. Wholers

[57] ABSTRACT

Seal oil contaminated with $H_2S$ has air or $N_2$ bubbled therethrough for reducing the $H_2S$ content of the liquid. The bubbling of the gas through the contaminated liquid is achieved by way of a novel two-state sparger unit situated in a container which receives the contaminated liquid, this container being vented at an upper portion to the outer atmosphere and being connected with a pipe which withdraws decontaminated liquid from the container.

7 Claims, 5 Drawing Figures

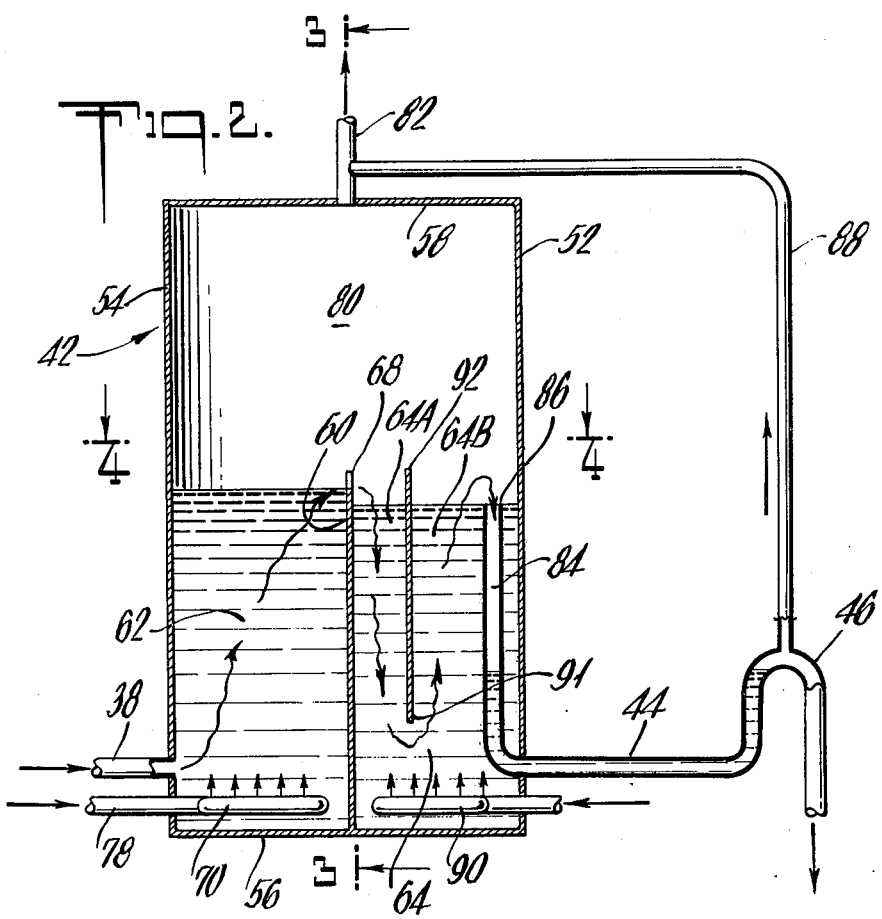
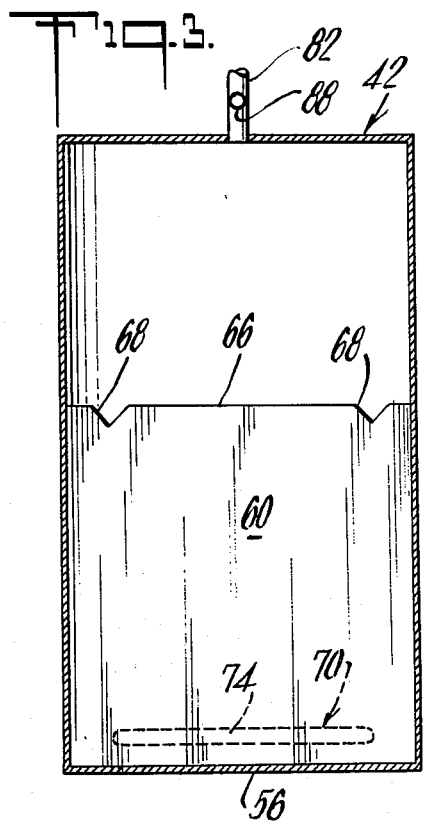
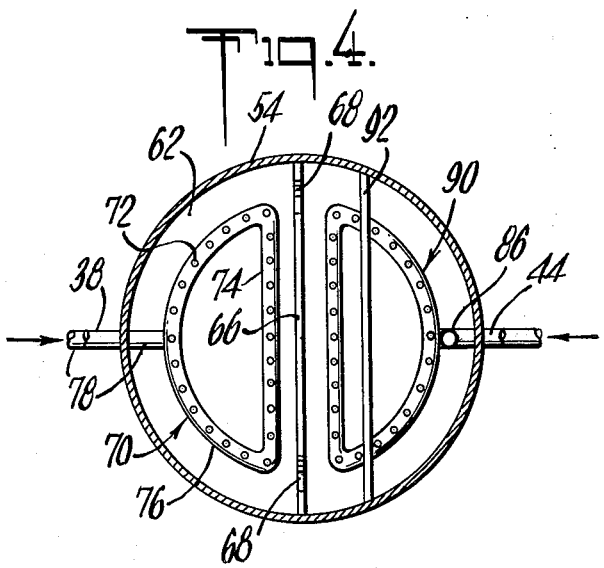

METHOD AND APPARATUS FOR RECLAIMING CONTAMINATED LIQUID

BACKGROUND OF THE INVENTION

The present invention relates to methods and apparatus for reclaiming contaminated liquid.

In particular, the present invention relates to a method and apparatus for reclaiming seal oil contaminated with $H_2S$.

Certain types of machines, such as centrifugal compressors, are required to process a gas which is sour, which is to say a gas which contains $H_2S$. Such machines include rotary shafts which must be sealed and lubricated. When the oil which leaks from such seals contains $H_2S$ resulting from contact with the process gas and is reused without being purified, it is possible for the $H_2S$ in the oil to cause a serious corrosion attack on babbitt-lined seal rings, thus drastically limiting the compressor run lengths.

The majority of centrifugal compressors in process gas service employ two liquid-film seals, each of which consists of two floating, non-rotating sleeves surrounding the compressor shaft with a close clearance. The sealing liquid is usually a compressor lube oil injected between the sleeves and flowing along the shaft so as to seal the extremities. The sealing liquid which passes through the inner of the two sealing rings, in other words the rings which face the interior of the casing of the compressor, comes into contact with the process gas and in so doing absorbs some of the gas. If this gas which contacts the sealing liquid contains $H_2S$, then this sealing liquid becomes corrosive and may attack the babbitt lining of the compressor seals and other equipment in the oil supply system. Thus, in the case of combined lube and seal oil systems, corrosive attack may extend to compressor bearings as well. In any event, corrosive attack on seals or bearings can have consequences ranging from excessive seal oil leakage to catastrophic failure of major equipment.

Corrosive damage to babbitt-lined components apparently is a function both of the metallurgical composition of the babbitt and the oil film operating temperature. These factors explain why some compressor seal designs are highly sensitive to $H_2S$-containing lube and-/or seal oils while others are not. However, there is in any event an incentive to remove $H_2S$ from seal oil even in apparently non-sensitive compressor installations because such removal will tend to reduce the formation of corrosion products due to interaction of $H_2S$ and steel piping, thus reducing the formation of sludge in the oil reservoir.

Up to the present time, efforts to purity sour seal oil in an inexpensive manner have been unsuccessful. Nevertheless, reclamation of contaminated seal oil is highly desirable when the available alternatives are considered. Thus, it is possible to inject an inert buffer gas in a once-through manner into the space between the compressor casing interior and the inner sealing rings, but such a procedure involves undesirably high operating and maintenance costs.

If the contaminated seal oil is simply discarded, then it is necessary to replenish the discarded oil at an average rate of 20 gallons per stream day for compressors with seals which are in good condition, although severely worn seals have been known to leak at rates as high as several hundred gallons per day resulting, of course, in highly undesirable cost and disposal problems. Thus, there is not only a high cost for clean make-up oil, but in addition there is a serious environmental disposal problem.

SUMMARY OF THE INVENTION

It is accordingly a primary object of the present invention to provide a method and apparatus capable of reclaiming sour seal oil in an inexpensive highly practical manner.

It is a further object of the present invention to provide a method and apparatus which lend themselves to use for many different types of installations according to which it may be desirable either to utilize a batch procedure or a continuous procedure, depending upon the particular conditions which are encountered in any given installation.

In particular, it is an object of the present invention to provide a method and apparatus capable of effectively and inexpensively reducing the $H_2S$ content of the oil to such an extent that the reclaimed oil can be recirculated and reused with only a minimum amount of make-up oil being added to the reclaimed oil, so that it becomes possible to assure an operation where babbitt of liquid-film seals as well as other parts of an oil supply system will not be undesirably attacked.

In addition, it is an object of the present invention to provide a method and apparatus capable not only of removing $H_2S$ from sour seal oil but also capable of effectively removing light hydrocarbons, so that there is no possibility of undesirable dilution effects resulting from light hydrocarbon contamination of the oil.

According to the invention, it has been found that if air or $N_2$ is bubbled through the oil contaminated with $H_2S$, then it is possible to reduce the $H_2S$ content thereof to such an extent that the oil can readily be reused for the seals of a machine such as a centrifugal compressor without any risk of undesirable corrosion attack. The contaminated oil which is to be treated is received in a container means in which is situated a suitable sparger unit from which the air or $N_2$ bubbles up through the oil to reduce the $H_2S$ content thereof. The mixture of air or $N_2$ with $H_2S$ is simply vented to the atmosphere while the reclaimed oil can readily be drawn off from the container after air or $N_2$ has bubbled through the oil, so that the reclaimed oil can be reused.

BRIEF DESCRIPTION OF THE DRAWINGS

The invention is illustrated by way of example in the accompanying drawings which form part of this application and in which:

FIG. 3 is a sectional view of the structure of FIG. 2 taken along line 3—3 of FIG. 2 in the direction of the arrows;

FIG. 4 is a cross-sectional view of the structure of FIG. 2 taken along line 4—4 of FIG. 2 in the direction of the arrows; and FIG. 5 is a graph illustrating results achieved with one and two stage operations according to the present invention.

DESCRIPTION OF PREFERRED EMBODIMENTS

Figure 1:
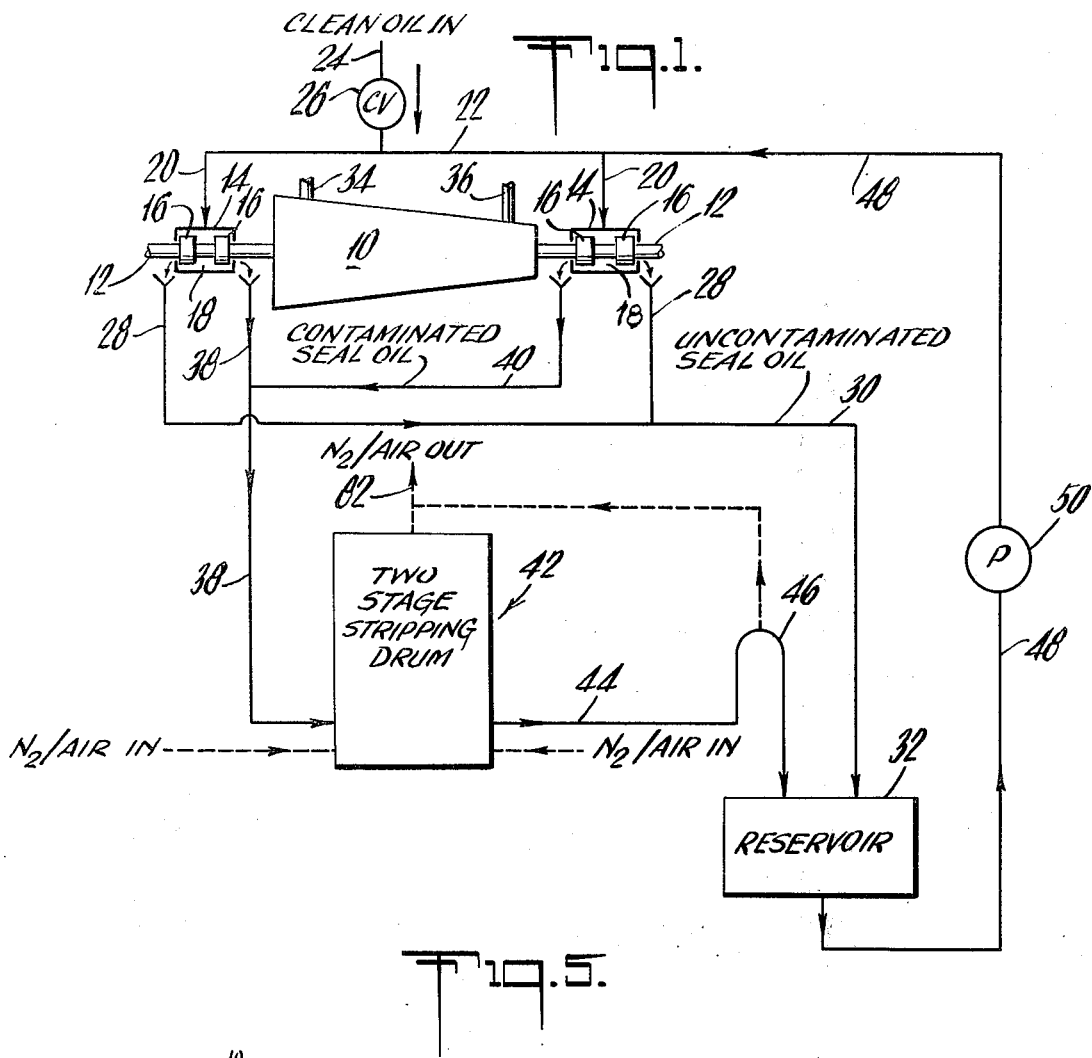
FIG. 1 is a schematic illustration of a compressor lubrication system according to which contaminated seal oil is continuously treated.

Referring first to FIG. 1, there is schematically illustrated therein a compressor 10 having a shaft 12 which rotates in a pair of liquid-film seal cartridges 14 which serve as seal retainer housings for the rotary shaft 12 of the compressor 10. Each of the liquid-film seal cartridges 14 includes a pair of floating, non-rotating sleeve portions 16 surrounding the shaft 12 and interconnected by an intermediate space portion 18 through which the shaft 12 freely extends.

The sealing liquid, usually a compressor lube oil, is supplied to the intermediate space portions 18 by suitable conduits 20 schematically shown in FIG. 1. These conduits 20 are supplied with seal oil either from a supply conduit 22 in communication through a conduit or pipe 24 and check valve 26 with a source of clean oil, or from recirculated oil conduit 48.

The lube oil delivered in this way to each of the units 14 lubricates and seals the shaft 12. Some of the oil travels outwardly away from the casing of compressor 10 to provide a liquid film at the outer sleeve units 16, and this oil forms the spent bearing oil which leaks out of the outer bearings 16 to flow along conduits 28 to a common collecting conduit 30 which delivers this spent bearing oil to a reservoir 32, as shown schematically in FIG. 1.

On the other hand, some of the oil delivered to the units 14 by way of the conduits 20 travels inwardly toward the casing of the compressor 10 through the inner sleeve units 16, and it is this oil which is contacted by the process gas compressed by the compressor 10, this gas entering, for example, through a gas inlet 34 and leaving through a gas outlet 36, as shown schematically in FIG. 1. Thus, if the process gas contains $H_2S$, the latter will contaminate the oil which leaks from the inner sleeve units 16, and it is this contaminated oil which must be purified in accordance with the invention before it can be reused in view of the considerations set forth above.

Thus, according to the present invention, the contaminated seal oil leaking from the inner sleeve units 16 is delivered, for example, by conduits 38 and 40 to an apparatus 42 in which the $H_2S$ is stripped out of the seal oil, the extent to which the $H_2S$ is eliminated being sufficient to render the treated seal oil suitable for reuse.

Thus, the purified seal oil is withdrawn from the apparatus 42 by way of a withdrawal means 44 in the form of a conduit part of which has the configuration of a trap 46, as shown schematically in FIG. 1, and from the conduit 44 the purified seal oil is returned to the reservoir 32 where it joins the non-contaminated seal oil delivered by way of the conduits 28 and 30 from the outer sleeve units 16, as described above. The seal oil in the reservoir 32 is returned from the latter by way of a conduit 48 to the supply conduit 22 in order to flow from the latter through the conduits 20 back to the units 14. The conduit 48 may be connected with a suitable pump 50 which provides the required flow of seal oil back to the compressor 10. In practice, once the system of FIG. 1 is set into operation, the major part of the seal oil is recirculated in the manner described above while the supply of additional oil through the conduit 24 serves only to make up relatively small losses in the seal oil resulting from the processing and recirculation thereof in the manner described in part above in connection with the system of FIG. 1 and in detail below in connection with the two-stage stripping drum of the apparatus 42.

Figure 2:
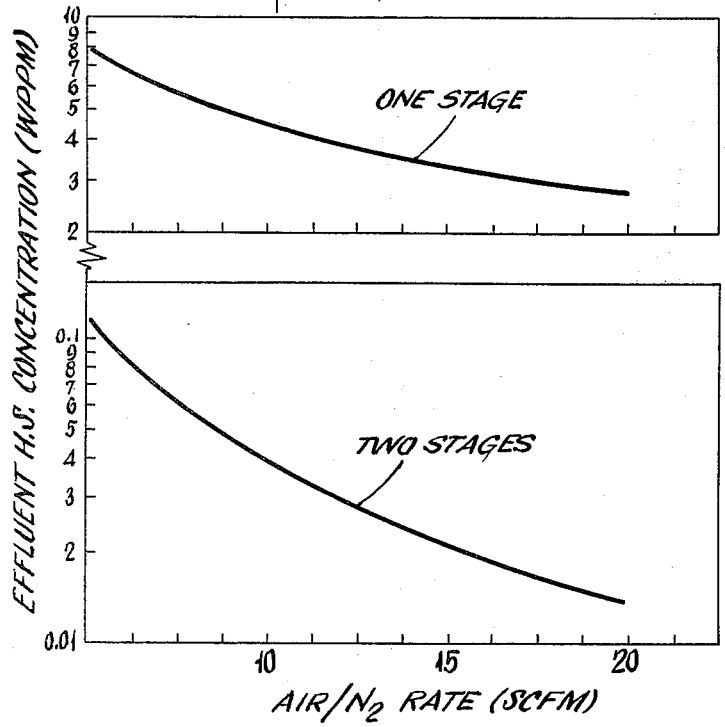
FIG. 2 is a sectional view of the two-stage stripping apparatus of the invention for treating the contaminated seal oil.

The details of the apparatus 42 are illustrated in FIGS. 2–4. Thus, as is apparent from FIGS. 2–4, the apparatus 42 includes a simple cylindrical drum 52. The drum 52 can have a size conforming in general to a conventional oil drum. Thus, the diameter of the drum 52 may be on the order of two feet while its height may be approximately twice its diameter. As is apparent from FIGS. 2–4, the drum 52 has an outer cylindrical wall 54, a bottom wall 56 and a top wall 58. Thus, the drum 52 forms a container means having a hollow interior for receiving the contaminated seal oil.

The lower interior portion of the drum 52 is provided with a baffle 60 in the form of a simple flat sheet of metal fixed at its outer side edges to the inner surface of the side wall of the drum at its bottom edge to the bottom wall 56, as shown most clearly in FIG. 3. Thus, the baffle 60 will extend through a height of approximately 2 feet upwardly from the bottom wall 56 and serves to divide the lower interior portion of the drum 52 into a pair of chambers 62 and 64 each of which has the cross section of a semicircle. The contaminated oil is delivered by the conduit 38 to that side of the baffle 60 where the chamber 62 is located, as is apparent from FIG. 2. In the illustrated example the top edge 66 of the baffle 60 is formed with a pair of V-notches 68 (FIG. 3), so that the oil delivered to the chamber 62 rises upwardly therein until the oil reaches the notches 68 to overflow into the chamber 64.

According to the present invention, it has been found that an extremely effective stripping of the $H_2S$ from the oil is capable of being achieved by bubbling up through the contaminated oil either air or nitrogen. For this purpose, there is situated in the lower region of the chamber 62 a sparger means 70 in the form of a pipe formed with a plurality of perforations 72 and having a configuration corresponding generally to the cross-sectional configuration of the hollow interior portion 62 of the container means 52. Thus, as will be seen from FIG. 4, the sparger means 70 has a straight pipe portion 74 extending parallel to the flat baffle 60 and a curved approximately semicircular pipe portion 76 corresponding approximately to the curvature of the side walls 54 of the container means 52. A pipe 78 communicates with any suitable source of air or $N_2$, and through this pipe one or the other of the latter gases is supplied under pressure to the semicircular pipe 70 in order to escape through the perforations 72, bubbling up through the contaminated oil and serving to strip $H_2S$ therefrom.

The mixture of $H_2S$ and either air or nitrogen thus reaches the upper free space 80 within the container means 52. A vent means 82 is operatively connected with the container means 52 in order to vent the hollow interior thereof to the atmosphere.

The oil which has had its $H_2S$ content reduced in the above-described manner in the first stage chamber 62 thus reaches the chamber 64 for further purification. The withdrawal means 44, which has the trap 46, described above, has in the interior of the chamber 64 an upwardly directed tubular portion 84 which terminates in an upwardly directed top open end 86. Thus, the level of the purified oil must reach the elevation of the opening 86 in order to flow downwardly along the pipe portion 84 to continue to flow along the conduit 44 to the reservoir 32 as described above. The configuration of the conduit 44 will provide a trap, as described above and as is shown in FIG. 2, and the upper gas space of this trap (or siphon breaker) communicates through a conduit 88 with the vent pipe 82.

The choice of air or nitrogen will depend upon safety and operating expense considerations. Generally an air sparger method is recommended unless the seal oil contains light hydrocarbons in which case it is safer to use $N_2$ as the stripping gas since $N_2$ can effectively remove the light hydrocarbons as well as the $H_2S$ without any danger of explosion. Thus, the removal of light hydrocarbons if they are present will serve to prevent any dilution effects due to light hydrocarbon contamination of the oil. The sparging air or $N_2$ will be delivered to the oil at a rate of 1–15 scfm depending upon the initial concentration of the $H_2S$.

The above method and apparatus may be operated according to a batch procedure with certain installations where the contaminated oil can be collected and treated once a day, while it is also possible to provide a continuous operation as is apparent from the above discussion.

The upper part of FIG. 5 shows the results capable of being achieved with a one-stage stripper apparatus as described above. Thus, depending upon the rate of supply of air or $N_2$, it is possible to reduce the $H_2S$ concentration of the seal oil as it spills through notches 68 to the extent shown in the upper graph of FIG. 5. Batch tests have been carried out with the method and apparatus referred to above on a one-stage basis, where a flow rate was approximately 10 scfm while a 55-gallon drum 52 was used containing 25–35 gallons of oil, and the results shown at the upper part of FIG. 5 were achieved. Experience has shown that bubbling of air or $N_2$ through the $H_2S$ contaminated seal oil, with venting as described above, will "desorb" and expel almost all of the $H_2S$ gas absorbed into the liquid and being in the form of a soluble component of a gas mixture which is dissolved in liquid. Thus, as is apparent from the upper graph of FIG. 5, very little $H_2S$ remains dissolved in the seal oil.

However, it is preferred to provide for most applications a two-stage method and apparatus. Purification in a second stage is carried out in the chamber 64 with the particular apparatus shown in the drawings. Thus, for this purpose, a second sparger means 90 which may be identical with the sparger means 70 is situated in the chamber 64 and will receive $N_2$ or air from the same source as the sparger means 70. It will be noted that the second sparger means 90 is of the same configuration as the sparger means 70 and is arranged in the chamber 64 so that the straight part of the sparger means 90 extends along the baffle 60 while the curved part extends along the side wall 54, this sparger means 90 also having approximately a semicircular configuration corresponding to the cross section of the chamber 64.

An additional baffle 92 situated in chamber 64 divides the latter into a first portion 64a and a second portion 64b. The baffle 92 is fixed at its opposed side edges to the inner surface of the side wall 54. This baffle 92 extends parallel to the baffle 60 and is situated between the latter and the upwardly extending pipe portion 84, as is apparent from FIG. 2. The baffle 92 extends to the elevation of the baffle 60, but it has a lower edge 94 situated well below the elevation of the opening 86 but above the sparger means 90. Thus, the oil which flows through the notches 68 must first flow downwardly through portion 64a between the baffles 60 and 92 and then around the lower edge 94 of the baffle 92 before flowing up through 64b, to the opening 86. By compelling the oil to travel in this way an exceedingly effective treatment thereof is achieved with the sparging gas in the second stage treatment taking place in the chamber 64. In effect, the gas bubbles rising in 64a pretreat or cleanse the oil which thereafter flows into portion 64b whereupon it is further treated by the rising gas bubbles on the right hand side of baffle 92.

In an actual construction the sparger means 70 and 90 were situated at a distance of two inches above the bottom wall 56 while the baffle 60 had a height of approximately two feet. The opening 86, on the other hand, is situated only at an elevation of approximately 1 inch below the elevation of the lowest parts of the notches 68, so that care must be taken when setting up the apparatus of FIG. 2 to make certain that it is perfectly level.

Although the essential components of the apparatus have been described above and shown in FIGS. 2–4, it is possible to add to the drum a suitable drain through which samples may be taken as well as a sight glass, if desired. The effect of utilizing two stages rather than one stage enables the achievement of a lower effluent $H_2S$ concentration by two orders of magnitude, so that an exceedingly effective removal of $H_2S$ is achieved with two stages. As may be seen from the lower part of FIG. 5, when a two-stage system is used, it is possible to achieve an extremely low concentration of $H_2S$. Thus, with the method and apparatus of the invention utilizing a two-stage system it is possible to achieve in the purified oil an extent of $H_2S$ on the order of 0.5 weight ppm.

Two-stage continuous sparging methods and apparatus according to the present invention are favored for general compressor applications since such a system is consistent with low manning requirements desired for routine process operations. Batch methods may, however, be favored in those installations which utilize a central sour seal oil collecting/reclamation facility.

The presence of the second baffle 92 assures that the liquid overflowing the V-notches 68 of the first baffle 60 will not travel too rapidly to the drawoff pipe 44. It will be noted that the arrangement of the system of FIG. 1 is such that the liquid flows by gravity from the first to the second chamber and into the drawoff pipe. The construction of the latter pipe as a trap assures that the drawoff pipe will always be sealed with a minimum liquid level. The design of the sparger means set forth above gives a good flow distribution over the cross sectional area of the drum while taking a pressure drop of 5 psi for the maximum expected vapor rate. By making the spargers identical for each stage, the rates of gas flow at both stages are approximately equal.

In general, the operating capacity of the method and apparatus of the invention should be equal to approximately one day's normal anticipated sour seal oil leakage for a given installation. The sparging air or $N_2$ rates should be approximately 2–4 scfm per square foot of total cross sectional area of the container means, assuming the sour seal oil flow rate to be 1 gph.

Two-stage designs should be used if there is a reasonable possibility that processing conditions will not remain stable or that the reclaimed seal oil must have purity levels significantly below 0.5 wppm $H_2S$.

The venting to the atmosphere of the mixture of $H_2S$ and air or $N_2$ is perfectly satisfactory. The extremely small amount of $H_2S$ which is discharged in this way to the outer atmosphere cannot be considered objectionable either from the point of view of worker health or from the point of view of community odor perception.

As was indicated above, safety considerations will govern the selection between $N_2$ or air as the sparging medium. Under doubtful conditions it is, of course, safer to use $N_2$.

What is claimed is:

1. A high efficiency method of removing $H_2S$ from contaminated seal oil comprising the steps of introducing said contaminated seal oil into a lower portion of a first stage compartment, introducing either gaseous nitrogen or air sparging gas into a lower portion of said compartment throughout a major portion of its bottom surface, allowing the seal oil to overflow from the top of said first stage compartment into the top of a first portion of a second stage compartment, said second stage compartment having a vertical partition wall therein extending above the surface level of the seal oil therein and terminating at its lower edge adjacent the bottom surface of said second stage compartment to divide said compartment into a first portion and a second portion and define a passageway for the flow of seal oil therebetween, introducing additional sparging gas across substantially the initial bottom portion of said first portion of the second stage compartment to thereby bubble said sparging gas upwardly through said first portion countercurrent to the downward flow of seal oil through said first portion, introducing a further supply of sparging gas into the bottom area of said second portion below the lower edge of said vertical partition wall to thereby bubble said sparging gas upwardly through the seal oil flowing under the bottom edge of said vertical partition into said second portion, withdrawing sparging gas containing $H_2S$ from the upper portion of said first and second stage compartments, and withdrawing seal oil substantially free of $H_2S$ at the surface level of the seal oil in said second portion of said second stage compartment.

2. The method of claim 1 wherein said sparging gas introduced into said first stage compartment is introduced about the periphery of the compartment's bottom surface adjacent the vertical walls thereof immediately below the level at which contaminated seal oil is introduced whereby sparging will take place of the bottom introduced contaminated seal oil continuously throughout its entire vertical rise in said first stage compartment prior to its overflow into said second stage compartment.

3. The method of claim 2 wherein the further sparging gas introduced into said first and second portions is introduced about the periphery of each portions bottom surface adjacent the vertical walls thereof whereby sparging of the seal oil flowing in the first and second portions will take place continuously throughout the entire flow of said seal oil through said portions.

4. A high efficiency apparatus for removing $H_2S$ from a contaminated seal oil with either a gaseous nitrogen or air sparging gas comprising, container means having a bottom wall, substantially vertical exterior side walls and a vent means in the top thereof, central plate means interior of said container means having side and bottom edges secured to said container means to divide said container means into substantially equal volume first and second stage compartments, said first stage compartment containing contaminated seal oil, additional plate means interior of said second stage compartment having side edges secured to said container means to divide said second stage compartment into a first portion and a second portion, said additional plate means having a bottom edge terminating adjacent to the bottom wall of said container means to define therebetween a passageway for the flow of seal oil from said first portion to said second portion, and a top edge extending higher than the seal oil level established in said first stage compartment by the top edge of said central plate means, means located adjacent the bottom wall of said container means for introducing contaminated seal oil into a lower portion thereof, first means comprising a perforated tube disposed adjacent the interior side walls of said first stage compartment and conforming to the wall contour thereof for introducing sparging gas bubbles upwardly through the seal oil introduced into said first stage compartment, second means comprising a perforated tube disposed adjacent the interior side walls of said second stage compartment passing below the bottom edge of said additional plate means and conforming to the wall contour thereof for introducing sparging gas bubbles upwardly through the seal oil in said first portion and second portion of said second stage compartment and seal oil withdrawal means located at the upper surface of said oil in said second portion whereby said contaminated seal oil is sequentially contacted first by sparging gas bubbles in the first stage compartment and thereafter in said first portion and second portion of said second stage compartment.

5. The combination of claim 4 wherein the vertical location of the means for introducing the contaminated seal oil is immediately above the first means for introducing sparging gas bubbles.

6. The combination of claim 5 wherein said container means is circular in cross section, and wherein said first means and said second means for introducing sparger gas bubbles are semicircular in shape.

7. The combination of claim 5 wherein the top edge of said central plate means includes two downwardly cut out portions to define a limited overflow channel for seal oil passing from said first stage compartment to said second stage compartment.

* * * * *